(No Model.)
H. E. KEYES & W. GLUCK.
STRAIGHTWAY VALVE.
No. 593,587. Patented Nov. 16, 1897.
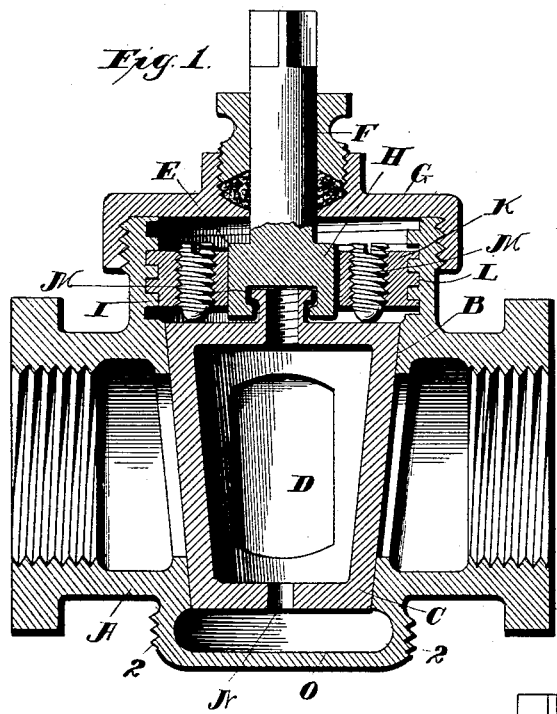
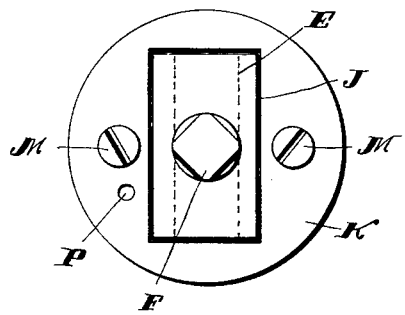
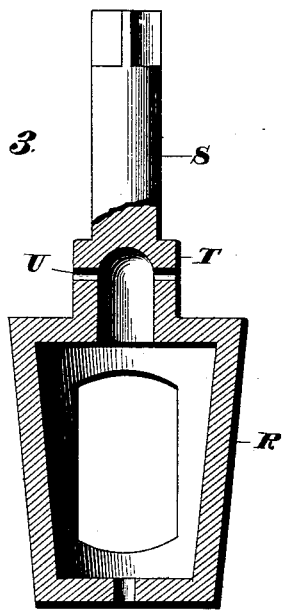
Witnesses
Inventor
Harry E Keyes
William Gluck
by Geo. H. Holgate
Attorney

UNITED STATES PATENT OFFICE.

HARRY E. KEYES AND WILLIAM GLUCK, OF HOMESTEAD, PENNSYLVANIA.

STRAIGHTWAY VALVE.

SPECIFICATION forming part of Letters Patent No. 593,587, dated November 16, 1897.

Application filed October 22, 1896. Serial No. 609,772. (No model.)

*To all whom it may concern:*

Be it known that we, HARRY E. KEYES and WILLIAM GLUCK, citizens of the United States, residing at Homestead, in the county of Allegheny and State of Pennsylvania, have invented a certain new and useful Improvement in Straightway Valves, of which the following is a full, clear, and exact specification.

Our invention relates to a new and useful improvement in straightway valves, and has for its object to provide a simple and effective means by which the plug of such a valve may be tightly bound upon its seat, and yet when opening the valve this pressure will be first removed from the plug in order that the turning of the valve may be accomplished with as little effort as possible and without the grinding action which would otherwise take place between the plug and its seat were it held thereon with any considerable force.

A further object of this invention is to so equalize the pressure above and below the plug as to leave said plug balance with the exception of its own weight.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 is a central vertical longitudinal section of a valve embodying one form of our invention; Fig. 2, a plan view of the plug-pressure nut and stem removed from the casing, and Fig. 3 a sectional elevation of a valve plug and stem combined which has a slightly-modified form of our invention.

In carrying out our invention we provide a casing A, which may be of any suitable design for a straightway valve, and within this casing we form a tapering seat B, in which is fitted a corresponding plug C. This plug is preferably hollow and has formed therethrough the openings D for the passage of the fluid through the casing when the valve is open, and formed upon the top of the plug is an elongated boss E, which is T-shaped in cross-section, as clearly shown in Fig. 1. The stem F passes through any suitable stuffing box or gland formed in the cap G, which is threaded upon the upper portion of the casing in the usual manner, and the lower end of this stem has formed therewith a head H, having a groove I therein which corresponds in cross-section to the T-shaped boss E, and the latter fits within said groove, so that the stem may act as a wrench upon the plug in turning it in either direction, as will be readily understood. The head H of the stem is rectangular in shape, as shown in Fig. 2, and fits within a corresponding opening J in the pressure-nut K, by means of which said nut is also revolved when the stem and plug are turned upon their axes, and the nut has suitable threads L formed upon its periphery, which engage with corresponding internal threads formed within the upper portion of the casing. In order that contact between the nut and the upper surface of the plug may be had and made adjustable, screws M are threaded through the nut, so that their lower ends, which are rounded, will project below the lower surface of the nut, thereby adapting them for contact with the upper surface of the plug, as will be hereinafter set forth.

From this description the operation of our improvement will be obviously as follows: When the valve is open and is to be closed, the stem is revolved by the application of a suitable wrench or hand-wheel and will in turn revolve the plug, so as to carry its openings crosswise of the casing and out of alinement with the passage through said casing, and at the same time the nut will also be revolved, as before described, in a direction which will cause it to move downward, which it is free to do on account of the loose connection therebetween and the head of the valve-stem, and this downward movement of the nut will bring the lower ends of the screws M in contact with the upper surface of the plug and finally firmly force said plug against its seat, so as to preclude the possibility of leakage. Now when it is necessary to open the valve a reversed movement of the stem is brought about, and this in turn will give the nut an upward movement, which will remove the pressure of the screws M from the upper surface of the plug, so that any further revolving of the stem will carry with it the plug; but as the pressure has been removed therefrom the plug will revolve without undue friction upon its seat, it being noted that the nut may continue to move upward without interfering with the valve stem or plug.

In assembling the valve the screws M are so adjusted relative to the movement of the nut and plug as to cause said screws to exert their greatest pressure upon the plug when the latter is approximately at right angle to the longitudinal axis of the casing. A hole N is formed in the bottom of the plug in order that when said plug is forced downward upon its seat the accumulation within the drip-chamber O may find a vent, so as not to interfere with the seating of the valve, and the valve is balanced by a hole P, formed in the top thereof, which will permit a certain quantity of the contents of the valve when flowing therethrough to gain access to the compartment above the plug, and thereby equalize the pressure which is exerted upon the under side of said plug.

To provide for the repair of the plug at any time without the necessity of having to provide an especial chuck for clamping the boss E, a hole is drilled in the center of the upper portion of the plug through the boss and is threaded, so that the plug may be run upon a threaded spindle or chuck to swing it in a suitable lathe.

In the modification shown in Fig. 3 we contemplate the formation of the plug R and the stem S in one boss, and when this is the case a head T, of the same general shape as that described in connection with the head H, is also formed within the stem in order that rotation may be given to the pressure-nut, as before described, and when this construction is used holes U are formed in the head, which latter are hollow, the cavity communicating with the interior of the plug, thereby permitting a certain quantity of the fluid passing through the plug to gain access to the compartment above the plug, which will equalize the pressure beneath the plug, as before described. The operation of this construction is similar in all other respects to that described in connection with Figs. 1 and 2.

In order that the valve-seat or other portion of the casing may be conveniently repaired, we provide threads 2 upon the exterior of the drip-catch, as shown in Fig. 1, by means of which the casing may be swung in a lathe having a threaded chuck.

Having thus fully described our invention, what is claimed as new and useful is—

1. A valve consisting of a casing, a tapered seat formed therein, a plug adapted to said seat, a stem for revolving said plug, a nut also revolved by said stem, and screws passing through said nut, whereby, when the latter is revolved in the proper direction, the lower ends of said screws will be brought in firm contact with the plug, substantially as and for the purpose set forth.

2. In combination with a casing, a tapered seat formed therein, a plug adapted to said seat, a boss formed upon the top of said plug, a stem having a head which embraces said boss, a nut arranged to be revolved by the stem, the threads of said nut engaging threads formed in the casing, and screws passed through the nut so as to bear upon the plug when the nut is properly manipulated, as specified.

3. The herein-described combination of a casing, a tapered seat formed therein, a plug adapted to said seat, a boss formed upon the top of said plug, a stem having a head embracing said boss, a nut surrounding the head so as to be revolved thereby, the threads of said nut engaging with suitable threads formed in the casing, so as to raise and lower the nut when revolved, screws passing through the nut and adapted to be brought into contact with the upper surface of the plug, and means for preventing a back pressure in the drip-chamber, substantially as and for the purpose set forth.

4. In combination with a valve of the character described, a plug, a boss, on the plug, a stem, a head on the stem embracing the boss, a nut surrounding the head, and screws run through the nut, as and for the purpose described.

5. A valve consisting of a casing, a plug fitting therein, a stem for revolving the plug, a head on the stem, a nut surrounding the head threaded in the casing and screws run through the nut, as and for the purpose described.

6. A valve consisting of a casing, a plug fitted therein, a stem for revolving the plug, a head formed on the stem, a nut surrounding the head and threaded in the casing and means for varying the amount of pressure of the nut on the plug, substantially as set forth.

In testimony whereof we have hereunto affixed our signatures in the presence of two subscribing witnesses.

HARRY E. KEYES.
    WILLIAM GLUCK.

Witnesses:
 S. S. WILLIAMSON,
 SMITH W. HILL.